(12) United States Patent
Nishimura

(10) Patent No.: US 7,498,776 B2
(45) Date of Patent: Mar. 3, 2009

(54) CONTROL DEVICE FOR VEHICLE AC GENERATOR

(75) Inventor: Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 477 days.

(21) Appl. No.: 10/577,729

(22) PCT Filed: Sep. 15, 2005

(86) PCT No.: PCT/JP2005/017047

§ 371 (c)(1),
(2), (4) Date: May 2, 2006

(87) PCT Pub. No.: WO2007/032074

PCT Pub. Date: Mar. 22, 2007

(65) Prior Publication Data

US 2008/0284386 A1   Nov. 20, 2008

(51) Int. Cl.
*H02P 9/14* (2006.01)
(52) U.S. Cl. .......................................... 322/28; 322/25
(58) Field of Classification Search ................ 322/22, 322/23, 24, 25, 27, 28, 37
See application file for complete search history.

(56) References Cited

U.S. PATENT DOCUMENTS 5,448,154 A * 9/1995 Kanke et al. ................. 322/28
6,294,899 B1 * 9/2001 Tokugawa et al. ............. 322/28
7,221,127 B2 * 5/2007 Masson et al. ................ 322/28
2003/0107350 A1 6/2003 Taniguchi
2004/0061482 A1 4/2004 Taniguchi

* cited by examiner

*Primary Examiner*—Nicholas Ponomarenko
(74) *Attorney, Agent, or Firm*—Sughrue Mion, PLLC

(57) ABSTRACT

A highly reliable control device for an AC generator without using a transistor and diode having high withstand voltage is provided.

A control device for a vehicle AC generator including a voltage control circuit that controls an output voltage of a rectifying circuit connected to a stator coil to a substantially constant level has a first active switch having its one end connected to one end of the field coil and having its other end connected a negative output terminal of the rectifying circuit, a second active switch having its one end connected to a positive output terminal of the rectifying circuit and having its other end connected to the other end of the field coil, a first passive switch connected between the negative output terminal of the rectifying circuit and a connecting point of the second active switch and the field coil, and a second passive switch connected between the positive output terminal of the rectifying circuit and a connecting point of the first active switch and the field coil, and the first and second active switches are on/off-controlled independently of each other.

5 Claims, 2 Drawing Sheets

CONTROL DEVICE FOR VEHICLE AC GENERATOR

TECHNICAL FIELD

This invention relates to a control device for a vehicle AC generator.

BACKGROUND ART

A conventional voltage control device for a vehicle AC generator detects an output voltage of a generator and stops supplying a field current to weaken a field flux when the detected output voltage is higher than a reference value. On the other hand, when the detected output voltage is lower than the reference value, the voltage control device reinforces the field flux. Thus, the output voltage is controlled to be substantially constant.

However, even when the supply of the field current is stopped, an inductance component exists in a field coil and an excessively high voltage is generated by this inductance component when shutting down the field current. Therefore, the voltage control device can be damaged.

Particularly in a recent vehicle AC generator with small size and high output, since the resistance of the field coil tends to be small and the inductance tends to be large, the overvoltage continuation time becomes longer accordingly.

Therefore, it has been proposed to switch to a circuit that consumes the energy of the field current by using resistance and diode in order to quickly reduce the field current, for example, as disclosed in Patent Reference 1.

Patent Reference 1: JP-A-2003-174799

DISCLOSURE OF THE INVENTION

Problems that the Invention is to Solve

Thus, in such a conventional device, since resistance to attenuate the field current and voltage drop of a diode are used, quick lowering of the current causes large loss and the voltage significantly rises (or is lowered). Therefore, a transistor for control having high withstand voltage is necessary and large heat generation occurs at the resistance and diode. The efficiency is low and temperature rise occurs, causing a problem that cooling is necessary.

In order to solve the problems as described above, it is an object of this invention to provide a highly reliable control device for AC generator without using a transistor and diode having high withstand voltage.

Means for Solving the Problems

In a control device for a vehicle AC generator according to this invention including a stator coil, a field coil, a rectifying circuit connected to the stator coil, and a voltage control circuit that performs shutdown of and energization with a field current flowing through the field coil in accordance with an output voltage of the rectifying circuit and that controls the output voltage of the rectifying circuit to a substantially constant level, the voltage control circuit has a first active switch having its one end connected to one end of the field coil and having its other end connected to a negative output terminal of the rectifying circuit, a second active switch having its one end connected to a positive output terminal of the rectifying circuit and having its other end connected to the other end of the field coil, a first passive switch connected between the negative output terminal of the rectifying circuit and a connecting point of the second active switch and the field coil, and a second passive switch connected between the positive output terminal of the rectifying circuit and a connecting point of the first active switch and the field coil, and the first and second active switches are on/off-controlled independently of each other.

Advantage of the Invention

According to this invention, a highly efficient and reliable control device for AC generator can be provided that does not use an expensive transistor and diode having high withstand voltage, and that can continue controlling a generated voltage even when short-circuit failure or the like occurs at a part of control transistors, and in which no heat generation at the time of switching occurs.

BEST MODE FOR CARRYING OUT THE INVENTION

Embodiment 1

FIG. 1 is a circuit structural diagram showing a control device for a vehicle AC generator according to Embodiment 1 of this invention. As shown in FIG. 1, a vehicle AC generator 10 has a stator coil 11, a rectifying circuit 12, a field coil 13, and a voltage control circuit 20.

The stator coil 11 is a three-phase winding and is wound on a stator core to from an armature. An AC output induced by the stator coil 11 is supplied to the rectifying circuit 12.

The rectifying circuit 12 is a full-wave rectifier that rectifies the AC output of the stator coil 11 to a DC output. A diode is used as a rectifying element corresponding to each phase of the stator coil 11.

The field coil 13 generates an interlinkage flux necessary for inducing the voltage of the stator coil 11. This field coil 13 is wound on a field pole to form a rotor and has its two ends connected to the voltage control circuit 20 via brushes 14, 14 or slip rings 15, 15.

The voltage control circuit 20 regulates the field current that energizes the field coil 13, thereby regulating the output voltage of the vehicle AC generator 1 within a predetermined range. To this end, the voltage control circuit 20 includes first and second-transistors 21, 22 of MOSFET or the like, first and second diodes 23, 24, a low-pass filter (LPF) 25, and voltage comparators 26, 27.

The first transistor 21 is connected between one end of the field coil 13 and the end of the negative electrode of a battery 30, and interrupts the field current. The second transistor 22 is connected between the other end of the field coil 13 and the positive electrode of the battery 30, and interrupts the field current.

The first diode 23 is connected in series to the second transistor 22 and has its anode connected to the negative electrode of the battery 30. The second diode 24 is connected in series to the first transistor 21 and has its cathode connected to the positive electrode of the battery 30. That is, the first and second transistors 21, 22 and the first and second diodes 23, 24 form a bridge circuit, together with the field coil 13.

The low-pass filter 25 is formed by, for example, resistance and capacitor. The low-pass filter 25 smoothes an output voltage Vg of the vehicle generator and supplies the smoothed output voltage to the first and second voltage comparators 26, 27.

In the first voltage comparator 26, a smoothed voltage Vs outputted from the low-pass filter 25 is applied to the negative terminal, and a first reference voltage Vref1 is applied to the positive terminal. When the voltage Vs becomes lower than the first reference voltage Vref1, a comparative output Vcon1 is turned to high level. On the other hand, when the voltage Vs becomes equal to or higher than the first reference voltage Vref1, the comparative output Vcon1 is turned to low level.

Meanwhile, in the second voltage comparator 27, the smoothed voltage Vs outputted from the low-pass filter 25 is applied to the negative terminal, and a second reference voltage Vref2 is applied to the positive terminal. When the voltage Vs becomes lower than the second reference voltage Vref2, a comparative output Vcon2 is turned to high level. On the other hand, when the voltage Vs becomes equal to or higher than the second reference voltage Vref2, the comparative output Vcon2 is turned to low level.

The comparative outputs Vcon1, Vcon2 of these voltage comparators 26, 27 are supplied to the gates of the first and second transistors 21, 22, respectively. When the output Vcon1 of the first voltage comparator 26 is at high level, the first transistor 21 is turned on. When the comparative output Vcon2 of the second voltage comparator 27 is at high level, the second transistor 22 is turned on.

In this construction, control is performed to keep one of the first and second transistors on constantly and turn the other transistor on and off, thus regulating the field current flowing through the field coil 13.

Hereinafter, the operation in the case of turning the first transistor 21 on and off and keeping the second transistor 22 on constantly in this Embodiment 1 will be described.

When a key switch, not shown, is turned on, the power of the voltage control circuit 20 is turned on and the generated voltage of the AC generator 10 (DC output voltage of the rectifying circuit) Vg is zero (the battery voltage is detected), which is lower than the reference voltages Vref1, Vref2. Therefore, the first and second voltage comparators 26, 27 output high-level outputs and both the first and second transistors 21, 22 are turned on.

Here, additional functions of an ordinary voltage control circuit will not be described in detail, such as detecting the rotation speed, setting a so-called initial excitation state where only a small field current is flowed when the rotation speed is equal to or lower than the engine idling speed, and setting an ordinary excitation state when the rotation speed increases later.

In the ordinary power generation state, where the engine is started and the AC generator 10 is driven by the engine, the generated voltage Vg is passed through the low-pass filter 25 that eliminates high-frequency components, and is compared with the reference voltage Vref1. When the generated voltage Vg is higher than the reference voltage Vref1, the first transistor 21 is turned off to shut down the field current If. When the generated voltage Vg is lower than the reference voltage Vref1, the first transistor 21 is turned on to flow the field current If.

In this case, when the first transistor 21 is turned off, the field current If does not immediately become zero because of the magnetic energy stored in the field coil 13. Therefore, a closed circuit passing through the second diode 24 is formed, and the current is attenuated by the resistance in the closed circuit as the current circulates through the closed circuit.

However, if a connected load 40 is suddenly shut down when large-output power generation is performed, the comparative output Vcon1 is switched to low level and the first transistor 21 is turned off, shutting down the field current If, as shown in FIG. 2. But, the field current If that is short-circuited in the closed circuit as described above takes time to attenuate, and the generated voltage Vg is higher than a predetermined voltage for a while.

Thus, in this Embodiment 1, the generated voltage Vg is compared with the second reference voltage Vref2, which is higher than the first reference voltage Vref1, and when the generated voltage Vg is higher than the second reference voltage Vref2, the second transistor 22, which has constantly been on, is turned off.

In this case, since the generated voltage Vg is higher than the first reference voltage Vref1, the first transistor 21, which is turned on and off normally, is already off. Moreover, since the generated voltage Vg is higher than the second reference voltage Vref2, too, the comparative output Vcon2 is switched to low level, as shown in FIG. 3, and the second transistor 22, which is normally on, is turned off.

Thus, a closed circuit is formed in which the current flows from ground to the first diode 23, brush 15, slip ring 14, field coil 13, slip ring 14, brush 15, second diode 24, and battery 30. As a result, a voltage is applied to the field coil 13 in the opposite direction to the flow of the current, and the field current If attenuates quickly. Thus, the generated voltage Vg is lowered fast (FIG. 3).

When the generated voltage Vg is lower than the second reference voltage Vref2, the second transistor 22, which is normally on, is turned on again. Therefore, the attenuation of the field current If becomes gentle and the generated voltage Vg is not lowered unnecessarily.

As the field current If is lowered further and becomes equal to or lower than the first reference voltage Vref1, the first transistor 21, which is normally turned on and off, is turned on and the field current If starts flowing again.

When the field current If reaches zero, the field power-supply voltage is cramped by the first diode 23 and the second diode 24. Therefore, the current does not flow backward through the field coil 13.

As described above, in this Embodiment 1, since the second transistor 22 on the one hand is constantly on, the field current If is controlled not to suddenly change and to generate a predetermined generated voltage, in ordinary use. Therefore, the loss due to large changes in the field current If that may occur in the case of a construction where the first transistor 21 and the second transistor 22 are constantly turned on and off simultaneously, can be reduced.

That is, the loss generated in the field coil 13 is the loss due to the average current plus the loss due to current changes. In the case of the construction where the first transistor 21 and the second transistor 22 are constantly turned on and off simultaneously, the loss is large because of large current changes. However, in this Embodiment 1, since one of the transistors is normally turned on and off, the loss due to current changes can be reduced, compared with the construction where the transistors are constantly turned on and off simultaneously.

Also, in Embodiment 1, since the two transistors to control the field current If are connected in series, even if short-circuit failure occurs in one of the transistors, the other transistor can turn on and off to control the generated voltage Vg. Therefore, a highly reliable AC generator can be provided.

Moreover, in the above-described construction, the voltage at the field coil end does not become equal to or higher than the power-supply voltage (battery voltage) plus the diode forward voltage, or equal to or lower than the ground voltage minus the diode forward voltage. Therefore, it suffices that the transistors interrupting the current and the diodes have withstand voltage corresponding to the power-supply voltage plus 2 multiplied by the diode forward voltage, and expensive transistors and diodes having high withstand voltage are not necessary.

Also, since the constantly on-state second transistor 22 is constantly on, no heat generation at the time of switching occurs, thus achieving high efficiency. In addition, since current does not flow in the second diode 24, loss is not generated, thus achieving good efficiency. Therefore, the second transistor 22 and the second diode 24 may be mounted on the same board as the first transistor 21 and the first diode 23. If both of the transistors 21, 22 are off when not in use, no voltage is applied to the field coil 13, and even if the device is left in a wet environment or the like, the exposed conductive part will not be corroded by electrolytic corrosion.

While the case of applying the invention to an AC generator having brushes and slip rings is described in the above-described Embodiment 1, the invention can also be applied to a brushless generator to provide similar effects.

Also, though the example of using a three-phase Y-connection as the stator coil 11 is described, delta connection, zigzag connection, or combination of these may also be used.

Moreover, while the example of using a single three-phase circuit is described in the above-described Embodiment 1, two three-phase circuits with shifted phases or the like may be used.

It is desirable that the voltage comparators 26, 27 should be provided with a positive feedback circuit (hysteresis circuit) and a negative feedback circuit (for preventing oscillation) in order to stabilize the operation.

DESCRIPTION OF REFERENCE NUMERALS AND SIGNS

Figure 1:
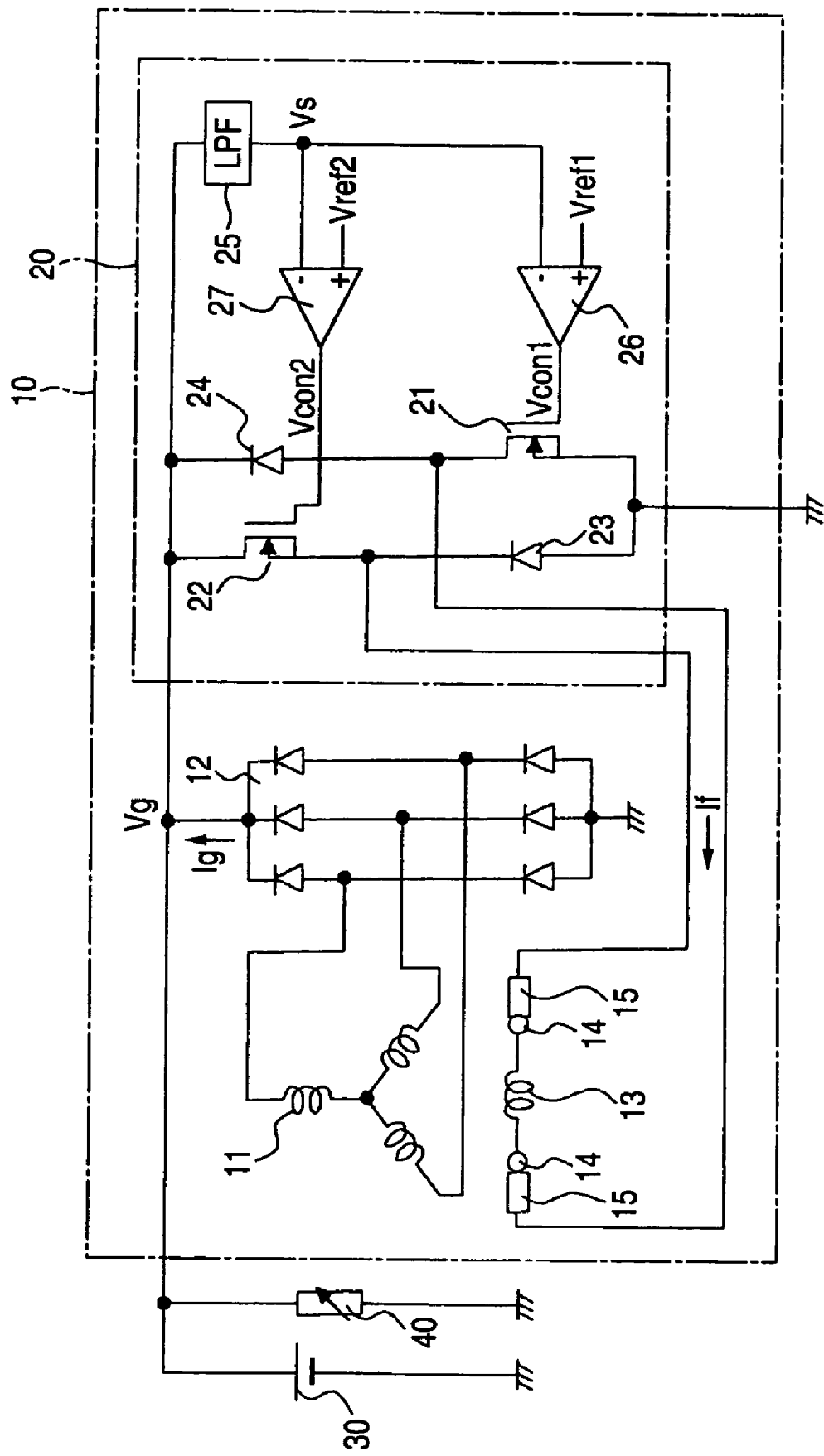
FIG. 1 is a circuit structural diagram showing Embodiment 1 of this invention.
Figure 2:
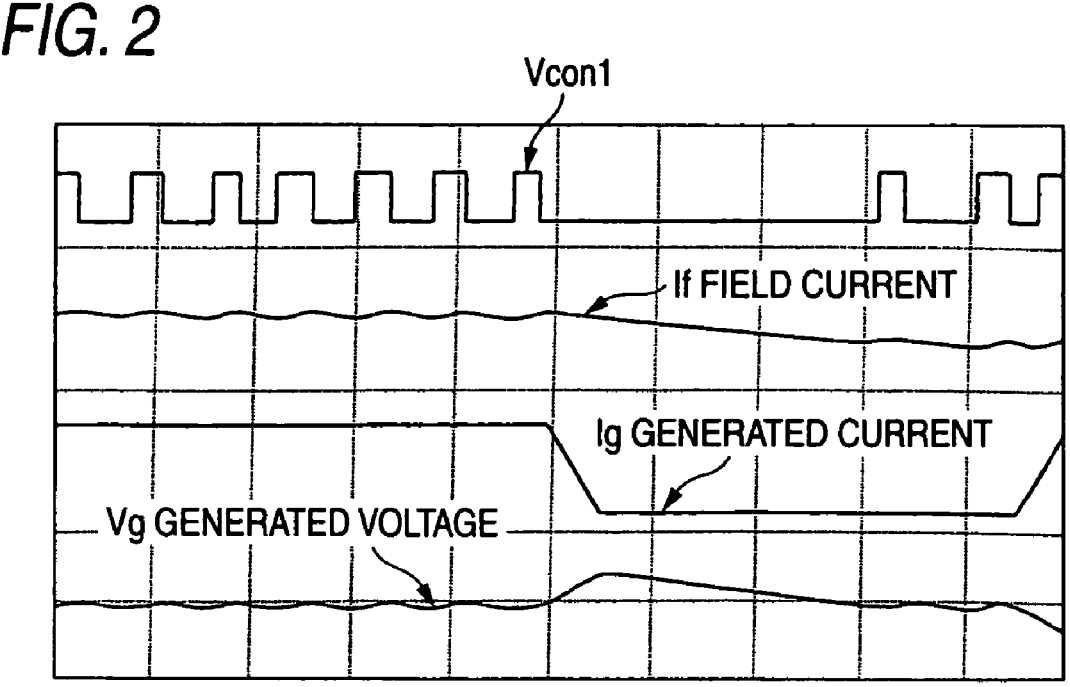
FIG. 2 is a view of signal waveform for explaining the operation of Embodiment 1.
Figure 3:
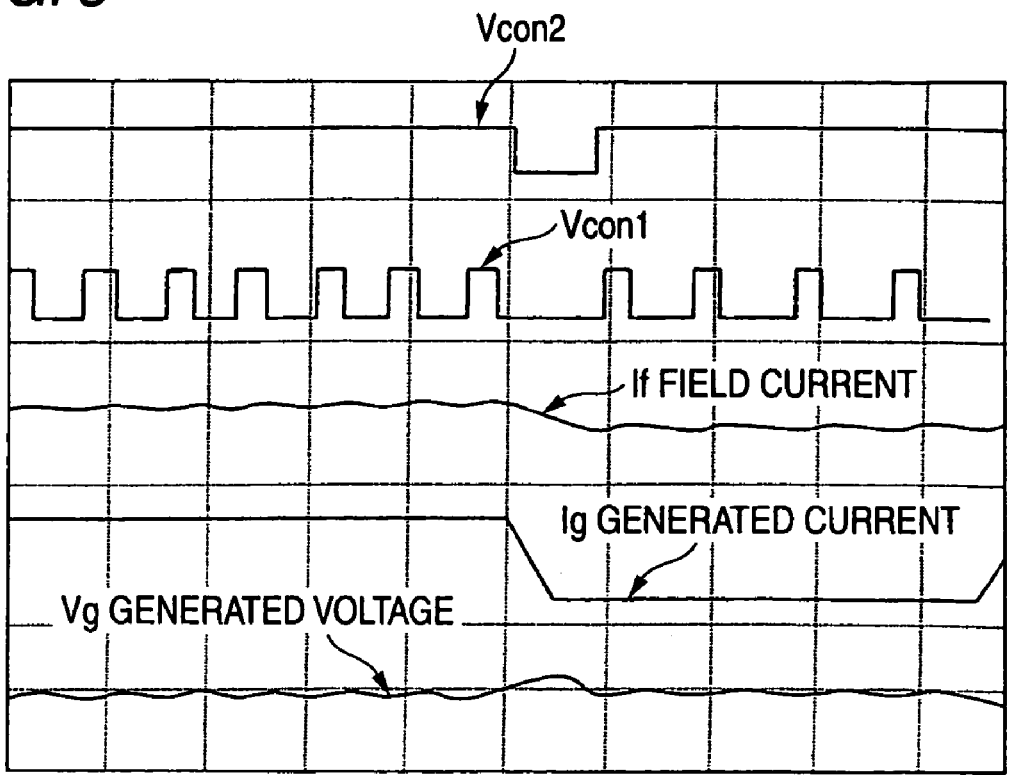
FIG. 3 is a view of signal waveform for explaining the operation of Embodiment 1.

10 AC generator
11 stator coil
12 rectifying circuit
13 field coil
14 brush
15 slip ring
20 voltage control circuit
21 first transistor
22 second transistor
23 first diode
24 second diode
25 low-pass filter (LPF)
26 first voltage comparator
27 second voltage comparator
30 battery
40 load

The invention claimed is:

1. A control device for a vehicle AC generator comprising a stator coil, a field coil, a rectifying circuit connected to the stator coil, and a voltage control circuit that performs shutdown of and energization with a field current flowing through the field coil in accordance with an output voltage of the rectifying circuit and that controls the output voltage of the rectifying circuit to a substantially constant level, characterized in that the voltage control circuit has
a first active switch having its one end connected to one end of the field coil and having its other end connected to a negative output terminal of the rectifying circuit,
a second active switch having its one end connected to a positive output terminal of the rectifying circuit and having its other end connected to the other end of the field coil,
a first passive switch connected between the negative output terminal of the rectifying circuit and a connecting point of the second active switch and the field coil, and
a second passive switch connected between the positive output terminal of the rectifying circuit and a connecting point of the first active switch and the field coil, and
the first and second active switches are on/off-controlled independently of each other.

2. The control device for the vehicle AC generator as claimed in claim 1, characterized in that one of the first and second active switches is constantly on and the other active switch is turned on and off in accordance with the output voltage of the rectifying circuit.

3. The control device for the vehicle AC generator as claimed in claim 2, characterized in that the other active switch shuts down the field current when the output voltage of the rectifying circuit is higher than a first predetermined voltage, while the other active switch controls performs energization with the field current when the output voltage of the rectifying circuit is lower than the first predetermined voltage, thus controlling the output voltage of the rectifying circuit to a substantially constant level, and when the output voltage of the rectifying circuit is higher than a second predetermined voltage that is higher than the first predetermined voltage, the another active switch is turned off.

4. The control device for the vehicle AC generator as claimed in claim 1, characterized in that the first and second active switches are connected to the field coil via brushes and slip rings.

5. The control device for the vehicle AC generator as claimed in claim 1, characterized in that the first and second active switches are transistors and the first and second passive switches are diodes.

* * * * *